United States Patent

Stowe et al.

[11] Patent Number: 4,482,203
[45] Date of Patent: Nov. 13, 1984

[54] ADJUSTABLE COUPLING DEVICE FOR A FIBER-OPTIC POWER DIVIDER

[75] Inventors: David W. Stowe, Buffalo Grove; Paul M. Kopera, Franklin Park, both of Ill.

[73] Assignee: Gould Inc., Rolling Meadows, Ill.

[21] Appl. No.: 563,545

[22] Filed: Dec. 21, 1983

Related U.S. Application Data

[63] Continuation of Ser. No. 245,291, Mar. 19, 1981.

[51] Int. Cl.³ .............................................. G02B 5/14
[52] U.S. Cl. .................................................. 350/96.15
[58] Field of Search ........................... 350/96.15, 96.16

[56] References Cited

U.S. PATENT DOCUMENTS

| | | | |
|---|---|---|---|
| 3,931,518 | 1/1976 | Miller | 350/96.15 |
| 4,135,780 | 1/1979 | Dyott | 350/96.15 |
| 4,150,870 | 4/1979 | d'Auria | 350/96.16 |
| 4,253,727 | 3/1981 | Jeunhomme et al. | 350/96.15 |
| 4,270,839 | 6/1981 | Cross | 350/96.15 |
| 4,294,513 | 10/1981 | Nelson et al. | 350/96.15 |
| 4,360,247 | 11/1982 | Beasley | 350/96.15 |
| 4,381,140 | 4/1983 | Hock | 350/96.23 |

*Primary Examiner*—William L. Sikes
*Assistant Examiner*—Robert E. Wise
*Attorney, Agent, or Firm*—K. H. Pierce

[57] ABSTRACT

An adjustable coupling device for fiber-optic power dividers in which the coupling characteristics of the divider are influenced by application of transverse forces on the optic fibers in a repeatable fashion. The preferred embodiment consists of a pair of optical fibers which are evanescently coupled by having a portion of each etched to a core and twisted about the other. The etched and twisted portions of these fibers are encased in a rigid housing filled with an elastic filler material. Means are provided for creating forces in the filler material which are transverse to the fibers.

11 Claims, 3 Drawing Figures

ADJUSTABLE COUPLING DEVICE FOR A FIBER-OPTIC POWER DIVIDER

This is a continuation of Ser. No. 245,291, 3/19/81.

BACKGROUND OF THE INVENTION

A. Field Of The Invention

The present invention relates generally to fiber-optic devices and more particularly to single-mode, fiber optic power dividers and means for tuning thereof.

B. Description Of The Prior Art

Single-mode optical fibers are currently used in high-capacity information systems and communications applications to transmit high-frequency signals. It is frequently necessary in such applications to join single-mode fibers or couple a multiplicity of fibers in order to modify the transmittal characteristics of a particular fiber system. Sheem and Giallorenzi, 4 Optics Letters, No. 10 (Oct. 1979) pg. 29, describe a single-mode fiber-optic power divider which consists of a pair of optical fibers encased in a housing. The Sheem et al. housing has a threaded cap at one end which may be manipulated to increase or decrease tension in the fibers during fabrication. One disadvantage of the device described by Sheem et al. is that the threaded cap must be machined and precisely threaded to fit the housing, generally made of quartz, on which it is used. Another disadvantage of the Sheem et al. device is that increased tension in the fibers can cause longitudinal and axial stress to build up in the fibers. This may enhance breakage. Conversely, slackening of the fibers, to reduce tension, results in increased optical losses and decreased coupling efficiency. From a practical point of view, a most important disadvantage of the Sheem device is that the threaded cap arrangement may only be used to adjust coupling characteristics during the fabrication stage of the device because the final stage of fabrication is to fill the device with a material which polymerizes within the housing to form a solid. Once the device has been fabricated, it is no longer possible to adjust its optical characteristics because attempts to adjust the threaded cap will easily strain the fibers and break them.

SUMMARY OF THE INVENTION

Thus, in accordance with the present invention, an adjustable coupling device is provided with a plurality of optical-fibers, each fiber having longitudinal sections in close proximity with the other fibers. A housing is also provided to encase the longitudinal sections and to create a stable environment about the longitudinal segments. A means for creating transverse forces along the longitudinal sections is also provided whereby strain on the longitudinal segments in the housing can be either increased or decreased in a repeatable fashion.

An object of the present invention is the provision of a means for turning an optical power divider after it has been fabricated.

Another object is to provide a means for tuning evanescent-wave optical-fiber couplers without creating undue longitudinal stresses on the fibers.

A further object of the invention is the provision of an inexpensive means for adjusting evanescent-wave optical-fiber couplers which is practical to manufacture and durable enough for non-laboratory uses.

Other objects, advantages, and novel features of the present invention will become apparent from the following detailed description of the invention when considered in conjunction with the accompanying drawings.

DESCRIPTION OF THE PREFERRED EMBODIMENT

Figure 1:
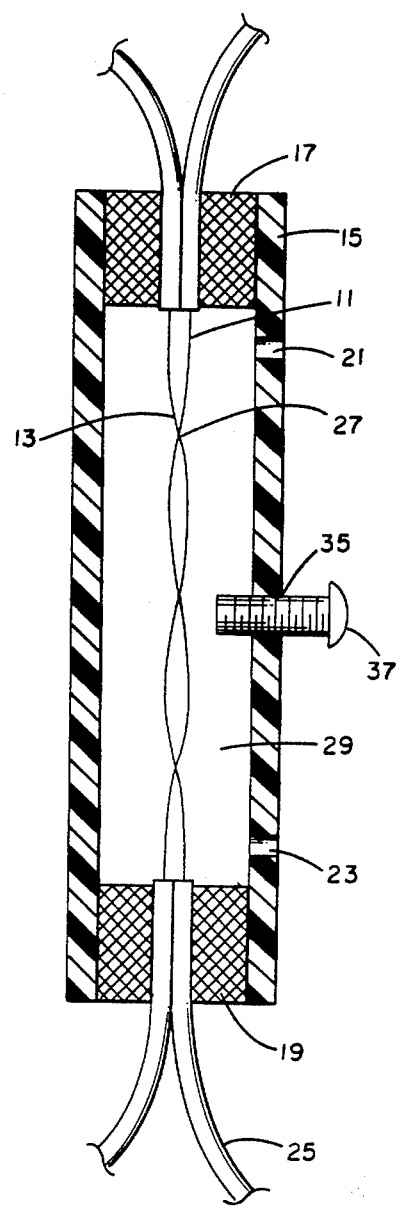
FIG. 1 is a mid-sectional plan view of the subject device in its preferred embodiment.

Referring now to FIG. 1, longitudinal portions 11 and 13 of two or more fibers are twisted about each other to increase surface area contact between the two fibers. The twisted portions of the fibers 11, 13 are secured in a geometry satisfactory for coupling in a housing 15 which is typically tubular in shape and provided with a pair of end caps 17 and 19, respectively, for sealing purposes. In one embodiment, two openings 21 and 23 are provided in the housing between end caps 17 and 19 to provide a conduit, the purpose of which will become readily apparent from the following description.

Single-mode optical fibers typically have a core diameter of only a few micrometers. This core material is surrounded by cladding. The core and cladding together are typically about 85 microns in diameter. In order for light from one fiber to be transferred to another fiber, this cladding must be substantially removed. Accordingly, an etchant material, such as buffered or nonbuffered hydrofluoric acid, is allowed to flow through the housing 15 between openings 21 and 23 until the cladding 25 is substantially dissolved and only a general core area 27 of each fiber 11, 13 remains so that a substantial amount of energy may be coupled evanescently from one fiber to another. The etching process itself is not unique and has been previously described by Sheem and Giallorenzi. After the fibers are etched to the general core area, the etched material is washed away through conduits 21 and 23. In the preferred embodiment, the housing 15 is then filled with room-temperature vulcanizing silicone (RTV) 29. A variety of filler materials other than RTV may be used. However, it is desirable that the filler material have a refractive index lower than that of the fiber core 27. If the refractive index of the filler material is higher, the filler material will "draw" light away from the twisted optical fibers and have the undesirable effect of creating excessive insertion losses. The refractive index of the filler material may change with variations in stress induced thereon. Another desirable characteristic of the filler material is that it should be a resilient material. One possible filler material is polyvinylidenefluoride, or more commonly PVDF. After housing 15 has been substantially filled with a filler material, openings 21 and 23 are then sealed.

In the preferred embodiment, an orifice 35 is provided in the housing 15. This orifice is used to admit a rigid body 37 into the housing interior. In the preferred embodiment, the rigid body 37 is a threaded screw. This screw, when advanced or retracted, provides deviations in stress across a transverse area of the optic fibers 11, 13. The rigid body 37 does not necessarily contact the optical fibers but rather deviations in stress are transmitted to the optic fibers through the elastic filler material.

Figure 2:
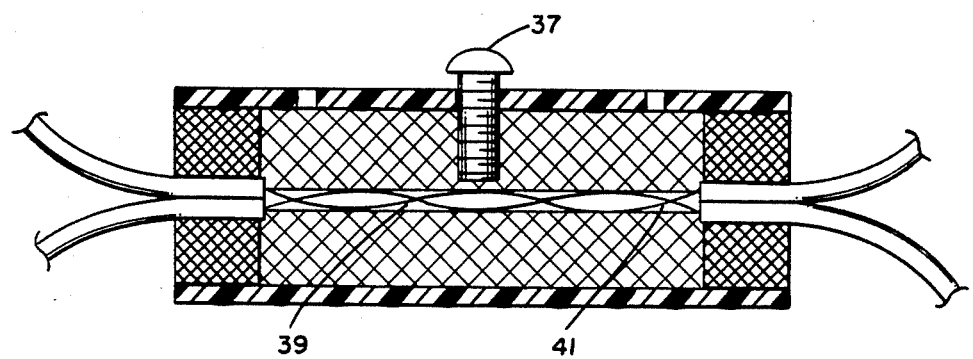
FIG. 2 is a schematic plan view of another embodiment of the subject device.

In the embodiment illustrated in FIG. 2, the subject invention is fabricated by placing a relatively thin coating 39 of RTV on the optic fibers and filling the remainder of the interior of the housing with an epoxy. A rigid, adjustable, force-creating body 37 is then introduced into the housing 15 and positioned to produce transverse forces directly on the coated fibers 41. This embodiment provides an extra-stable environment for the fragile, etched fibers and reduces any longitudinal forces that may result from exertion of the rigid transverse force inducing body 37 on the fibers 41.

Figure 3:
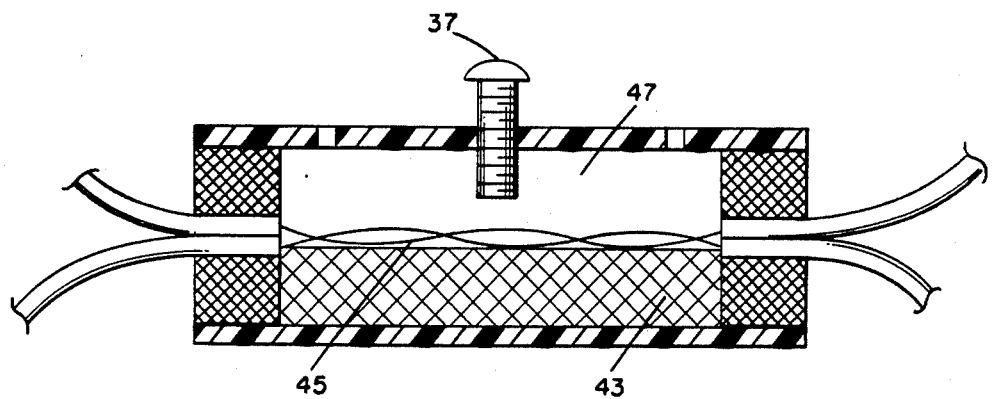
FIG. 3 is a schematic plan view of yet another embodiment of the subject device.

In yet another embodiment, as illustrated in FIG. 3, the housing may be partially filled with a relatively inelastic epoxy 43 upon which etched optic fibers 45 may rest. The remainder of the housing is then filled with relatively elastic RTV 47 FIG. 3, and transverse forces are transmitted from the rigid body to the fibers through the RTV. In this embodiment, stability of the fibers is created through the use of the epoxy base.

One advantage of all of the above described embodiments is that generally transverse rather than longitudinal forces are used to adjust the coupling characteristics of the fibers. It is desirable to use transverse forces rather than longitudinal because transverse forces are less likely to cause breakage of the fragile, fiber-optic core area.

Another advantage of using transverse rather than longitudinal forces to vary the coupling characteristics is that once that coupler is fabricated, no additional strains of large magnitude are induced on the fiber core area. This includes axial strains due to twisting and longitudinal strains due to stressing of the type that is likely to occur with the prior-art, end-cap type of adjustment.

Another advantage of the subject development is that transverse forces are concentrated on a central portion of the etched and twisted fibers where coupling efficiency is high rather than concentrated at one end of the housing where coupling efficiency is considerably lower.

In all of the embodiments described above, the means for creating transverse forces on the optic fibers has been a rigid threaded screw. The use of a screw is currently the preferred means because of the ease with which the device can be fabricated. Other advantages in the use of threaded screws as the force creating means are:

(1) they are simple to manually advance or retract in a repeatable manner;
(2) they are relatively inexpensive; and
(3) they are available in a variety of sizes and shapes to allow for variances in coupling requirements and characteristics.

Another means for creating repeatable transverse forces on the optic fibers is to provide a rigid band about the circumference of the housing, the band being provided with an implement to reduce or increase the circumference of the housing in a repeatable fashion to create transverse forces on the optic fibers encased therein.

While there has been described what is at present considered to be the preferred embodiment of the present invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An adjustable evanescent-wave coupling device for optical fibers comprising:
   (a) housing means for rigidly encasing longitudinal portions of said optical fibers in close proximity to one another to allow optical evanescent-wave coupling to occur
   means for maintaining said portions in a stable pressure environment including an elastic filler material in said housing means encasing said longitudinal portions; and
   (b) force creating means for repeatably producing transverse forces through said filler material onto a segment of said longitudinal portions to vary the optical coupling characteristics of said fibers.

2. An adjustable evanescent-wave, optical-fiber coupling device comprising:
   (a) a plurality of optical fibers, each fiber having longitudinal segments in close proximity with another of said fibers to allow optical coupling to occur in said evanescent-wave coupling device;
   (b) a rigid housing encasing said longitudinal segments, said housing creating a generally stable pressure environment about said longitudinal segments;
   (c) an elastic filler material in said housing surrounding said longitudinal portions; and
   (d) means for varying stress on said filler material in a repeatable manner in said housing along an axis transverse to said longitudinal segments to adjust the coupling characteristics of said fibers.

3. The adjustable coupling device as described in claim 2 wherein said means for varying stress comprises a threaded member projecting into said housing through said filler material in a direction transverse to said longitudinal segments to receive rotational forces applied to said threaded member to move said member in said housing through said filler material along a path transverse to said longitudinal portions.

4. The adjustable coupling device as described in claim 2 wherein said filler has a refractive index which changes with variations in stress created by said stress-varying means.

5. The adjustable coupling device as described in claim 4 wherein said filler material has a refractive index which is lower than the refractive index of said encased segments.

6. The device as described in claim 4 wherein said pressure-varying means comprises a threaded inelastic member protruding through said outer shell into said elastic filler material, said threaded member movable in a direction transverse to said longitudinal segments, said threaded member adapted to receive rotational forces to move said member in said transverse direction to create pressure changes in a portion of said filler material which are transmitted to said longitudinal segments along a transverse axis to adjust the coupling characteristics of the fibers.

7. An adjustable coupling device for a single-mode fiber-optic power divider comprising:
   (a) a plurality of optical fibers, each fiber being etched to a general core area and wound about each other to create a longitudinal segment of core areas having close proximity to one another to allow optical coupling to occur;
   (b) an inelastic shell surrounding said longitudinal segment, said shell being substantially filled with an elastic filler material to provide a stable environment about said longitudinal segments, said shell being provided with a receiving aperture; and (c) an inelastic member protruding into said filler material through said receiving aperture, said inelastic member being movable in a repeatable path transverse to said longitudinal segments to create a transverse stress differential in said filler material about said longitudinal segments to vary the evanescent coupling characteristics of each fiber.

8. An adjustable coupling device fabricated by the steps comprising:

(a) securing a longitudinal portion of a plurality of closely spaced optical fibers within a rigid housing;

(b) etching said longitudinal portion of said fibers to a core area;

(c) surrounding said etched fibers with a resilient material; and (d) providing a rigid, force-inducing body within said housing to apply transverse forces through said resilient material onto a portion of said etched fibers, said force-inducing body being equipped with an adjusting means to vary the transverse force induced on said fibers.

9. The device as described in claim 8, wherein said force-inducing body comprises a threaded screw and said adjusting means comprises a threaded aperture in said housing to allow said screw to be manipulated along a path transverse to said longitudinal fibers through said resilient material.

10. A method of tuning an evanescent-wave optical coupler comprising:

applying a variable force in a repeatable manner through a resilient material to longitudinal segments of a plurality of closely spaced, single-mode, optical fibers encased in a rigid housing, said longitudinal segments of said fibers having exposed cores, said force being applied in a direction transverse to said longitudinal segments.

11. An optical fiber apparatus comprising:

(a) encasing means for rigidly encasing and for maintaining longitudinal portions of said fibers in a stable pressure environment and for maintaining said fibers in close proximity to one another to allow evanescent-wave optical coupling to occur said encasing means including resilient filler material surrounding said longitudinal portions;

(b) means for varying the optical coupling between said fibers by producing adjustable transverse forces through said filler material in a repeatable fashion on a segment of said longitudinal portions.

* * * * *